United States Patent [19]

Pregitzer et al.

[11] 4,227,980

[45] Oct. 14, 1980

[54] PHOTOREACTIVE COATING COMPOSITIONS BASED ON URETHANE MODIFIED ACRYLATES

[75] Inventors: Siegfried A. Pregitzer, Long Island; Jay K. Laufer, Huntington; John J. Marino, Kings Park, all of N.Y.; James W. Hancock, Scotch Plains, N.J.

[73] Assignee: Whittaker Corporation, Los Angeles, Calif.

[21] Appl. No.: 941,760

[22] Filed: Sep. 13, 1978

Related U.S. Application Data

[63] Continuation of Ser. No. 726,010, Sep. 22, 1976, abandoned.

[51] Int. Cl.$^2$ ............................ C08F 2/50; C08F 4/00
[52] U.S. Cl. ........................ 204/159.23; 204/159.15; 526/312; 560/33; 560/115
[58] Field of Search .................. 204/159.23, 159.15, 204/159.19; 526/312; 560/33, 115

[56] References Cited

U.S. PATENT DOCUMENTS

| | | | |
|---|---|---|---|
| 2,921,006 | 1/1960 | Schmitz et al. | 204/159.15 |
| 3,479,328 | 11/1969 | Nordstrom | 560/33 |
| 3,494,901 | 2/1970 | Oertel et al. | 526/312 |
| 3,840,448 | 10/1974 | Osborn et al. | 204/159.15 |
| 3,907,865 | 9/1975 | Miyata et al. | 204/159.23 |
| 4,126,747 | 11/1978 | Cowherd et al. | 560/33 |

*Primary Examiner*—Walter C. Danison
*Attorney, Agent, or Firm*—Henry M. Bissell

[57] ABSTRACT

Novel photoreactive coating compositions based on urethane modified acrylates which may be employed alone or in mixtures with other photoreactive acrylates are disclosed.

3 Claims, No Drawings

PHOTOREACTIVE COATING COMPOSITIONS BASED ON URETHANE MODIFIED ACRYLATES

This is a continuation of application Ser. No. 726,010, filed Sept. 22, 1976, now abandoned.

BACKGROUND OF THE INVENTION

Low molecular weight, low-viscosity acrylate esters are commonly employed as photoreactive diluents in solventless U.V. curable formulations for coatings, inks, adhesives, etc. Photoreactive diluents of choice are often low-viscosity hydroxy-acrylates, such as hydroxyethyl acrylate and hydroxypropyl acrylate. While such hydroxy-acrylates reduce the viscosities of coating and ink formulations, they also reduce their rate of cure and tend to yield soft coatings. In addition, the high volatility and high toxicities of these hydroxy-acrylates preclude their use in many applications.

It is an object of this invention to find a class of modified acrylates whereby the desirable low viscosity is retained while the cited disadvantages are avoided or minimized.

DETAILED DESCRIPTION

It has been found that the hydroxy-acrylates may be modified by reaction with a suitable mono-isocyanate to produce a monomer which possesses reduced volatility and toxicity. Furthermore, the rate of cure by radiation of these monomers is greatly enhanced, and their cured films are hard and glossy. The novel urethane modified acrylates have the following structural formula:

$$R-\underset{\underset{H}{|}}{N}-\underset{\underset{O}{\|}}{C}-O-R'-O-\underset{\underset{O}{\|}}{C}-\underset{\underset{R''}{|}}{C}=CH_2$$

wherein
  R is $C_{4-6}$ alkyl, such as butyl, pentyl or hexyl, cyclohexyl; or $C_{6-8}$ aryl, such as phenyl, o-, m- or p- tolyl, benzyl, xylyl or o-, m- or p- ethylphenyl,
  R' is $C_{2-4}$ alkylene, such as ethylene, propylene or butylene, and
  R" is H or $CH_3$.

The alkyl and alkylene groups may be either straight chain or branched chain.

In a preferred embodiment,
  R is butyl, cyclohexyl or phenyl,
  R' is propylene of the formula $$(-\underset{\underset{CH_3}{|}}{CH}-CH_2-)$$

with the pendant methyl group on the carbon atom closest to the carbamate radical, and
  R" is H.

In a more preferred embodiment,
  R is phenyl,
  R' is propylene of the formula $$(-\underset{\underset{CH_3}{|}}{CH}-CH_2-)$$

with the pendant methyl group on the carbon atom closest to the carbamate radical, and
  R" is H.

Another aspect of this invention relates to the novel radiation curable decorating inks comprising
  at least one photoreactive compound of the formula:

$$R-\underset{\underset{H}{|}}{N}-\underset{\underset{O}{\|}}{C}-O-R'-O-\underset{\underset{O}{\|}}{C}-\underset{\underset{R''}{|}}{C}=CH_2$$

wherein R, R' and R" are as defined above;
  at least one photoinitiator;
  at least one free radical inhibitor; and
  at least one pigment.

Ketone type photoinitiators, such as benzophenone, t-butyl-alpha-trichloroacetophenone and benzil, may be used. The preferred photoinitiators in these coatings are alpha, alpha-diethoxyacetophenone (a Union Carbide product) and the isobutyl ether of benzoin. The amount of photoinitiator present is not critical, and generally from about 2 to 20% by weight based on photoreactive compound is employed.

Hydroquinone type free radical inhibitors are employed in very small amounts to stabilize the unexposed composition when they are not being exposed to U.V. radiation. Examples of suitable free radical inhibitors are p-methoxyphenol and p-benzoquinone.

Most any commercial pigment can be used with this ink system. Among them are rhodamines, rubines, lithols, red lake C, 2-B reds, phthalo blues and greens, carbon blacks, alkali blues, methyl violets, moly oranges, benzidine yellows, chrome yellows, carbazole violets, etc. A few pigments cannot be used in this system because of stability problems. For example, iron blues have very limited stability.

Fillers and waxes which are used in conventional inks can also be used in this ink system. Magnesium carbonate, aluminum carbonate, fumed silicas, waxes such as polyethylenes, polytetrafluoroethylenes, fatty esters, and fatty amides can be used.

Suitable aniline dyes for the purpose of the invention include, for example, Iosol Red, B.C. 74708; Iosol Black, B.C. 74704; Iosol Yellow, B.C. 74711; Iosol Orange, B.C. 74707; Iosol Violet, B.C. 74710; Iosol Green, B.C. 74706; and Iosol Blue, B.C. 74705. All of the above dyes are marketed by Allied Chemical Corporation. There can also be employed those aniline dyes supplied under the trade name Azosol and produced by General Aniline and Film Corporation. These may be classified according to the following chemical categories: azo acids or amions (Fast Orange RA, Fast Brilliant Red BN and 3BA, Fast Yellows RCA and GT); azine base or cation (Spirit Nigrosine SSB); sulfonate cupric phthalocyanine (Fast Blues HLD and HLR); azo acid phthalocyanine mix (Fast Green HLAS;) and triphenylmethanes (Brilliant Green BA and Methyl Violet XXA). Also, organic fluorescent colorants such as fluorescent dyes can be employed, e.g., Rhodamine B, Calcofluor Yellow HEB, and the like. When employing fluorescent colorants, generally larger amounts thereof are used than when employing the above noted aniline dyes.

By the term "pigment" as used herein is meant those colored organic and inorganic compounds which are normally used in the art to impart color as well as organic dyes which are used for the same purpose. There is no restriction as to pigments or dyes except that they be nonreactive to the components of the ink. Illustrative of the various inorganic pigments are titanium dioxide, carbon black, metallic flakes, powders and dusts such as aluminum powder, bronze powder, and the like. Organic pigments and dyes which can be used include Phthalocyanine green, Phthalocyanine blue, Permanent red 2B, Lithol red, Lithol rubine, Toluidine red, Hansa yellow, Toluidine yellow, oil soluble dyes and the like.

There is no criticality in respect to the amount of coloring material to be used. However, sufficient colorant should be used to provide good covering properties with the proper density of color. While economic factors generally determine the maximum amount of pigment to be used, it goes without saying that pigments should not be used in such amounts as to cause the ink to chalk on drying, or to make the viscosity of the ink unreasonably high. Generally, pigments are used in an amount of from 20 to 60% based on the total components of the ink. Naturally the specific amount of pigment used is dependent upon the coloring properties of the pigment, the properties of the inks and so forth.

Another aspect of this invention relates to the radiation curable can coatings comprising
at least one photoreactive compound of the formula:

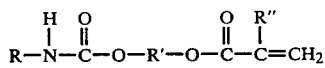

wherein R, R' and R'' are as defined above;
at least one photoreactive resin;
at least one photoinitiator;
at least one acrylic monomer or oligomer;
at least one lubricant; and
at least one free-radical inhibitor.

Photoreactive resins include diacrylates based on epoxides, such as Dow Chemical's XD8036.02 and XD8076.0; low functional acrylate novolac epoxides, such as Dow Chemical's XD8031.02, and half-esters of maleic anhydride and hydroxy-$C_{2-3}$ alkyl acrylates. The amount of photoreactive resin present is not critical.

The acrylic monomer or oligomers may be mono-, di- or trifunctional, such as 1,6-hexanediol diacrylate, trimethylolpropane triacrylate and 2-ethylhexyl acrylate. The amount of acrylic monomer or oligomer present is not critical.

The lubricant may be a silicone, polyethylene, polytetrafluoroethylene or other conventional lubricant known in the art. Preferred lubricants are Byk 301 (Mallincrodt Chemical) and MP-22XF wax (Micro Powders, Inc.). The amount of lubricant present is not critical.

The coatings of this invention are capable of being polymerized into a thermoset type polymer with the use of electron beam or ultra violet radiation. When the latter is used, a photoinitiator is present to increase cure rate efficiency. The term photopolymerization is used to describe the latter.

Advantages of using a radiation curable container coating are numerous. However, two advantages distinctly stand out over the rest. One is being able to convert the radiation curable coating with less energy in a shorter period of time than is possible with conventional type thermal cured solvent release type coatings. The other advantage is being able to convert with introducing a minimum of organic effluent to the atmosphere.

Most of the currently available commercial radiation curing equipment on the market is sufficient for converting these coatings. Most efficient curing has been found to occur when using 200-300 watt per inch medium pressure mercury arc lamps which are housed in elliptical reflectors. Using lamps of lower wattage, for example, a 100 watt per inch lamp will reduce the cure rate by more than a factor of two if compared directly to a 200 watt per inch lamp. This factor is not directly related to a power function but appears to have some relation to the difference in spectral output of 100 watt versus 200 watt per inch lamp. Elliptical reflectors are preferred over parabolic type reflectors because they concentrate the radiation into a narrow band helping to overcome oxygen inhibition, which has a retarding effect on the rate of cure, providing more efficient curing. Equipment which provides an inert atmosphere such as nitrogen is generally not necessary to achieve satisfactory cure rates when using ultra violet radiation, but it is not a detergent. Electron beam curing equipment is generally equipped with nitrogen inerting. Some of the manufacturers of radiation curing equipment include Thermogenics; Ashdee, Hanovia, Union Carbide, Radiation Polymer; Sun Chemical, and the American Can Company.

The compositions of the can coatings in this invention cure by way of a free radical vinyl addition polymerization process. This process is induced by either electron beam or ultra violet radiation. Thermal energy, although not needed, generally accelerates the rate of polymerization. A thermal postcure is sometimes necessary following radiation curing in order to optimize coating film properties such as adhesion, abrasion resistance, and lubricity. A thermal postcure also removes any unreacted monomer or initiator from the film.

The following examples are given to illustrate the invention and are not intended to limit it in any manner. All parts are given in parts by weight unless otherwise expressed.

EXAMPLE 1

N-Phenylcarbamate of 2-Hydroxypropyl Acrylate

Phenyl isocyanate (1996 g., 16.77 moles) and dibutyltin dilaurate (1 g) were charged to a 5 l. round-bottomed flask equipped with stirrer, dropping-funnel, condenser and drying-tube. To the stirred mixture was added dropwise (4 hours) hydroxypropyl acrylate (97% pure, 2247 g., 16.77 moles). The reaction was exothermic. The reaction temperature was maintained at 60° by cooling as necessary. Upon completion of this addition, the mixture was maintained at 60° for a further 3 hours, when the isocyanate content was found to be 0.22 wt. %. Sufficient methanol (7.1 g.) was then added to scavenge the residual isocyanate. p-Methoxy-phenol inhibitor (2.0 g.) was then added, and the product discharged.

The product was a colorless liquid having a viscosity of 716 cps at 25°, as measured with a Brookfield Viscometer. Analysis indicated the absence of isocyanate functionality, and hence complete reaction.

A mixture of the product with 10 wt. % of a photoinitiator (the iso-butyl ether of benzoin) was drawn into a film upon a metal substrate. The film was irradiated by passage at 600 ft./min. beneath a focused Hanovia Ultraviolet Lamp (200 watts/in.). The cured coating was hard and glossy.

EXAMPLE 2

Curable Can Coatings Based on N-Phenylcarbamate of 2-Hydroxypropyl Acrylate

| Material | Coating A | Coating B | Coating C |
|---|---|---|---|
| Dow XD8036.02 resin | 10.0 | 14.5 | |
| Dow XD8031.02 resin | | | 46.0 |
| N-phenylcarbamate of 2-hydroxypropyl acrylate | 61.0 | 51.6 | 24.0 |
| 1,6-hexanediol diacrylate | | | 20.0 |
| Trimethylol propane triacrylate | | 10.7 | |
| 2-ethyl hexyl acrylate | 14.0 | 12.8 | |
| MP-22XF wax | | 0.74 | |
| Byk 301 | 5.0 | 4.7 | 4.0 |
| α,α-diethoxy acetophenone | 10.0 | 4.6 | 6.0 |

Coating A was used as a wet ink finishing varnish for both aluminum and steel two piece cans. The varnish exhibited excellent gloss, lubricity, abrasion, adhesion, flexibility, and pasteurization resistance. It was successfully applied to the printed cans via the varnishing unit on a Rutherford 800 decorator (commercial Spindle Can Decorator). The varnish was applied to each can at approximately 120 mgs weight. Curing of the varnish took place at speeds ranging from 200-600 cans per minute using three 48″ long, medium pressure mercury arc lamps operating at 200 watts per inch. Following the radiation curing, the cans were given an inside conventional coating and thermally baked for about 2½ minutes at temperatures not exceeding 420° F.

Coating B is a very similar formulation to Coating A but containing an additional lubricant, MP22-XF. This additional lubricant was added to help prevent the loss of lubricity when cans are pasteurized in a bath containing excess chloride ion. Generally, most pasteurization baths do not contain excess chloride ion.

EXAMPLE 3

N-Cyclohexylcarbamate or Hydroxypropyl Acrylate

Cyclohexyl isocyanate (125.2 g., 1.0 mole) and dibutyltin dilaurate (0.2 g.) were charged to a 1 l. round-bottomed flask equipped with stirrer, dropping funnel, condenser and drying-tube. To the stirred mixture was added dropwise (1 hr.) hydroxypropyl acrylate (97% pure, 134 g., 1.0 mole). The reaction was exothermic, and the temperature was maintained at 60° by cooling as necessary. Upon completion of addition, the reaction temperature was maintained at 60° for a further two hours after which the residual isocyanate content was found, by analysis, to be less than 0.1 wt. %. The product, a pale yellow liquid, had a viscosity of 310 cps at 24°, as measured with a Brookfield viscometer.

A mixture of the product with 10 wt. % of a photoinitiator (the iso-butyl ether of benzoin) was drawn into a film upon a mejtal substrate. The film was irradiated by passage at 600 ft./min. beneath a focused Hanovia Ultraviolet Lamp (200 watts/in.). The cured coating was hard and glossy.

While this invention has been illustrated by specific examples, the scope thereof is limited only by the following claims.

What is claimed is:

1. A radiation curable decorating ink comprising:
a substantial proportion of at least one photoreactive compound of the formula:

$$\underset{R-N-C-O-R'-O-C-C=CH_2}{\overset{H\phantom{xx}O\phantom{xxxxxxx}O\phantom{xx}R''}{|\phantom{xx}||\phantom{xxxxxxx}||\phantom{xx}|}}$$

wherein
R is cyclohexyl or $C_{6-8}$ aryl,
R' is $C_{2-4}$ alkylene, and
R'' is H or $CH_3$;
2% to 20% of at least one photoinitiator based upon the weight of said photoreactive compound;
at least one free radical inhibitor; and
20% to 60% of at least one pigment based upon the total weight of said ink.

2. The decorating ink of claim 1 wherein
R is phenyl,
R' is propylene of the formula $$(-\underset{\underset{CH_3}{|}}{CH}-CH_2-)$$

and
R'' is H.

3. A radiation curable can coating comprising:
a substantial proportion of at least one photoreactive compound of the formula:

$$\underset{R-N-C-O-R'-O-C-C=CH_2}{\overset{H\phantom{xx}O\phantom{xxxxxxx}O\phantom{xx}R''}{|\phantom{xx}||\phantom{xxxxxxx}||\phantom{xx}|}}$$

wherein
R is cyclohexyl or $C_{6-8}$ aryl,
R' is $C_{2-4}$ alkylene, and
R'' is H or $CH_3$;
at least one photoreactive resin;
at least one photoinitiator;
at least one acrylic monomer or oligomer;
at least one lubricant; and
at least one free-radical inhibitor.

* * * * *